United States Patent [19]
Melling et al.

[11] Patent Number: 5,818,026
[45] Date of Patent: Oct. 6, 1998

[54] HAND-MARKED LOTTERY SELECTION SLIP SCANNING SYSTEM AND METHOD

[75] Inventors: Alan Melling, Warrenton, Pa.; Robert Durst, East Setauket; Steven Chew, East Northport, both of N.Y.

[73] Assignee: Symbol Technologies, Inc., Holtsville, N.Y.

[21] Appl. No.: 597,234

[22] Filed: Feb. 6, 1996

[51] Int. Cl.$^6$ .................................................. G06K 7/10
[52] U.S. Cl. .................... 235/470; 235/487; 235/494; 273/138.1; 273/139; 283/903
[58] Field of Search .................................. 235/470, 487, 235/494; 283/903; 273/138.1, 139

[56] References Cited

U.S. PATENT DOCUMENTS

| | | | |
|---|---|---|---|
| 5,138,140 | 8/1992 | Siemiatkowski et al. | 235/470 |
| 5,235,172 | 8/1993 | Oehlmann | 235/494 |
| 5,249,801 | 10/1993 | Jarvis | 283/903 |

OTHER PUBLICATIONS

Lottery Selection Slip In Game Called "Jun. 1949". undated.

*Primary Examiner*—F. L. Evans
*Attorney, Agent, or Firm*—Kirschstein, et al.

[57] ABSTRACT

A system and method for capturing hand-marked cells from a lottery selection slip. The lottery slip includes a conventional play region of cells (labelled sequentially from 1 to 49, for example) for receiving indicia to be captured, after receiving indicia said play region of cells includes a plurality of occupied cells defined by marked cells and a plurality of non-occupied cells defined by unmarked cells. The lottery slip also includes row-identifier bar codes located at opposite boundaries of the play region. The bar codes are electro-optically scannable and readable and are arranged in a plurality of ordered rows tiered along the transverse direction over the transverse distance of the play region. A scanner is used to generate scan lines that extend over the play region of cells occupied by the indicia and over each bar code and for decoding the row identifer data for each scan line as each line transverses the boundaries of the play region of cells, the occupied cells having different light reflectivity than the non-occupied cells. A decoder captures the identity and the location of the occupied cells and the non-occupied cells and stores the digitized signal. A ticket receipt is then issued representative of the numbers selected by the player. By using a bar code scanner to read both the row identifier codes and the actual hand-marked play region the need for precise positioning within traditional terminals is obviated.

11 Claims, 4 Drawing Sheets

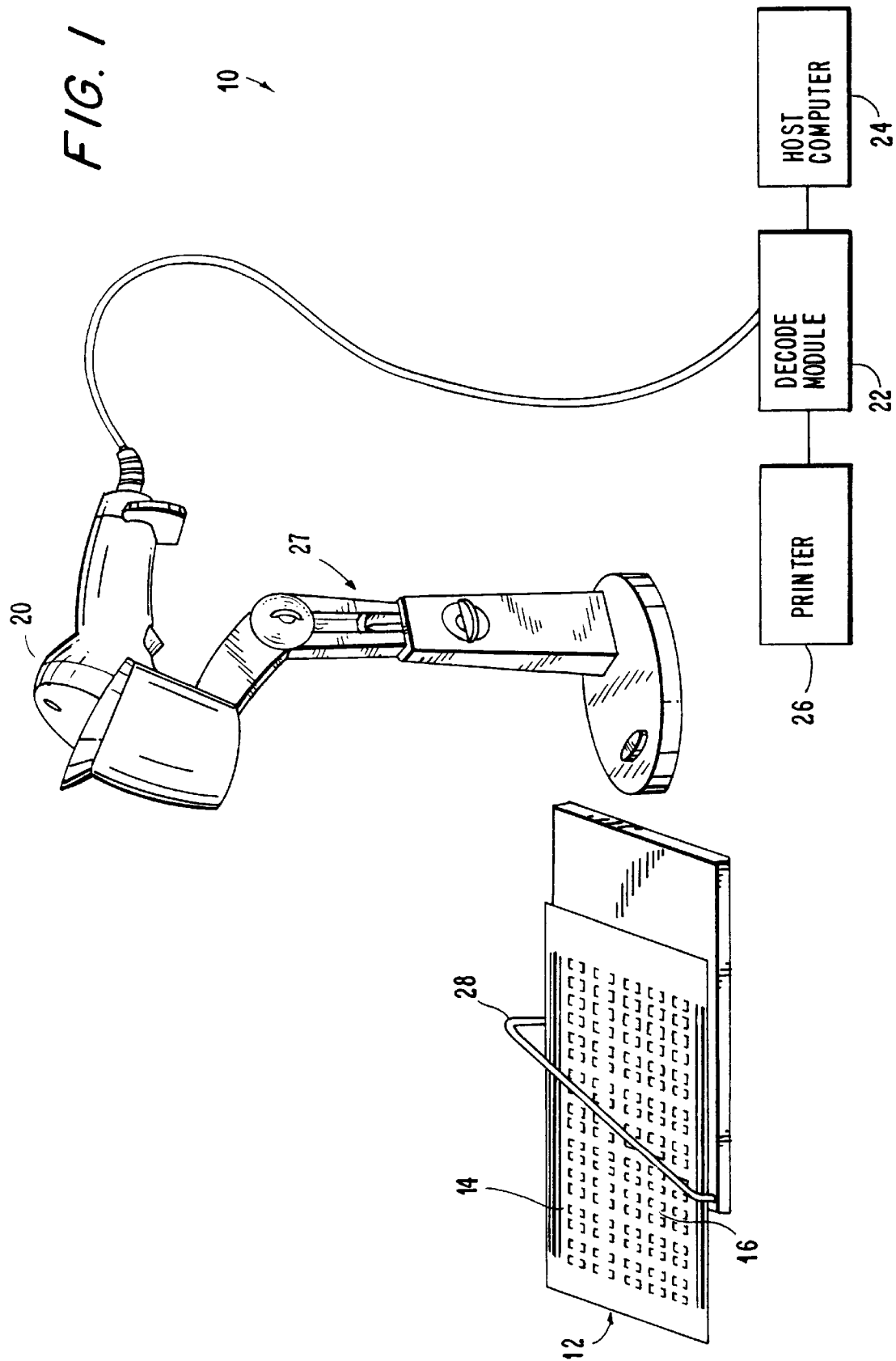

HAND-MARKED LOTTERY SELECTION SLIP SCANNING SYSTEM AND METHOD

FIELD OF THE INVENTION

This invention relates to the field of scanning systems for reading bar codes and hand-mark information and particularly, to a system and method for combining pre-printed indicia with hand-mark information to form a machine readable lottery selection slip that can be read by a bar code scanning system.

BACKGROUND OF THE INVENTION

A lottery selection slip is used by a player to select a predetermined subset of numbers from a set of available numbers. The selection slip is read and a ticket receipt is issued listing the numbers selected by the player on the slip.

For example, a lottery game called "6/49" requires the player to select six numbers from a possible 49 numbers. The player manually darkens predetermined cells on the selection slip corresponding to the desired number being selected. A hand-mark sense reader then detects the various darkened areas on the selection slip, and based on the relative position of the darkened areas on the selection slip, information describing the hand-mark sense information is formed, i.e. the numbers selected by the player.

To determine the relative position of the darkened areas on the selection slip prior art hand-mark sense readers must accurately feed or position the slip relative to the reader. Accordingly, variations in the size and shape of the slip are limited. In addition, traditional hand-mark sense readers are electronically entirely different than a bar code reader, they are not capable of reading bar codes, and generally cost more to produce than bar code readers.

SUMMARY OF THE INVENTION

An object of the present invention is to provide a system and method for reading hand-marked lottery selection slips having a pre-printed bar code information region and a hand-mark information region.

In accordance with one aspect of the present invention there is provided an arrangement for capturing hand-marked cells from a lottery selection slip comprising: (a) means defining a play region of cells on said lottery selection slip for receiving indicia to be captured, after receiving indicia said play region of cells includes a plurality of occupied cells defined by marked cells and a plurality of non-occupied cells defined by unmarked cells; wherein the sum of the occupied cells and non-occupied cells equals the total number of cells in the play region; (b) row-identifier code means located at opposite boundaries of the play region, said code means including electro-optically scannable and readable encoded data arranged in a plurality of ordered rows tiered along the transverse direction over the transverse distance of the play region, each row extending along the longitudinal direction, data in each row of each code means including row identifier data for identifying each row; and (c) scanner means for electro-optically scanning light along scan lines that extend over the play region of cells occupied by the indicia and over each code means, and for decoding the row identifer data for each scan line as each line transverses the boundaries of the play region of cells, the occupied cells having different light reflectivity than the non-occupied cells; said scanner means comprising: (i) a housing; (ii) means in the housing for generating a beam spot exteriorly of the housing; (iii) means for sweeping the beam spot along mutually parallel sweep directions to form a raster pattern consisting of a plurality of mutually parallel scan lines; (iv) means for capturing the identity and the location of the occupied cells and the non-occupied cells, wherein the capturing means includes means for generating a digitized electrical signal having two states, each indicative of one of the occupied and non-occupied cells, and means for storing the digitized signal.

In accordance with another aspect of the present invention there is provided a method of capturing hand-marked cells from a lottery selection slip comprising the steps of: (a) providing a play region of cells on said lottery selection slip for receiving indicia to be captured, after receiving indicia said play region of cells includes a plurality of occupied cells defined by marked cells and a plurality of non-occupied cells defined by unmarked cells; wherein the sum of the occupied cells and non-occupied cells equals the total number of cells in the play region; (b) providing row-identifier codes located at opposite boundaries of the play region, said code means including electro-optically scannable and readable encoded data arranged in a plurality of ordered rows tiered along the transverse direction over the transverse distance of the play region, each row extending along the longitudinal direction, data in each row of each code means including row identifier data for identifying each row; and (c) scanning along scan lines that extend over the play region of cells occupied by the indicia and over each code means, and for decoding the row identifer data for each scan line as each line transverses the boundaries of the play region of cells, the occupied cells having different light reflectivity than the non-occupied cells; (d) capturing the identity and the location of the occupied cells and the non-occupied cells; (e) generating a digitized electrical signal having two states, each indicative of one of the occupied and non-occupied cells; and (f) storing the digitized signal.

BRIEF DESCRIPTION OF THE DRAWINGS

Embodiments of the invention will be described by way of example in conjunction with the drawings in which:

FIG. 1 illustrates a lottery selection slip reading system according to an embodiment of the present invention;

DETAILED DESCRIPTION OF EMBODIMENTS OF THE INVENTION

Figure 2A:
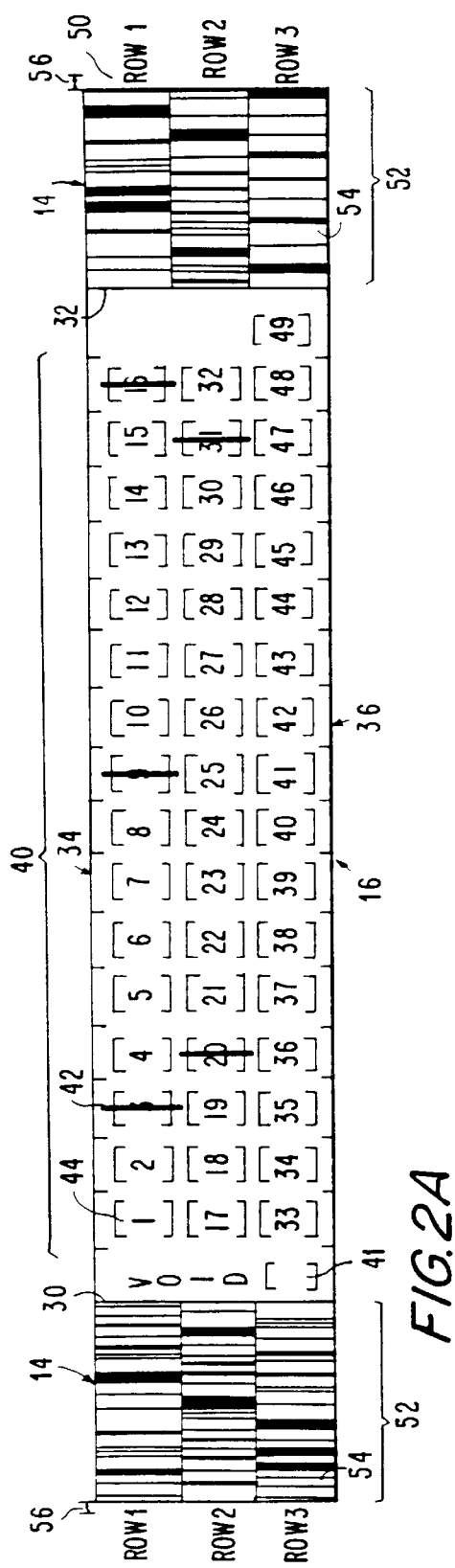
FIG. 2A illustrates a schematic representation of a portion of the lottery selection slip shown in FIG. 1.

FIG. 1 illustrates a reading system 10 for reading a lottery selection slip 12 that includes a fixed, pre-printed bar code information region 14 as well as a variable hand-mark information region (or play region) 16. The reading system 10 includes a scanner 20 for scanning selected portions of the lottery slip 12. Various types of desk-top, portable, and hand-held scanning systems are exemplified by U.S. Pat. Nos. 4,369,361; 4,387,297; and 4,4409,470.

The scanner 20 outputs a digitized signal that is representative of the scanned portions of the slip 12. A decode module 22 receives the digitized signal generated in the scanner 20, and calculates the desired data, e.g. the numbers selected by the player on the selection slip 12, in accordance with an algorithm contained in a software program. The decoding scheme will be discussed in further detail hereinbelow.

Upon a successful decode of the information contained in play region 16, the decode module 22 communicates to a host computer 24 the decoded data, e.g. the numbers selected by the player. The host computer 24 updates its internal database to add the numbers selected by the player. A ticket receipt (not shown) is printed by a printer 26 attached to the decode module after the selected numbers have been sent to the host computer 24.

FIG. 2A illustrates a portion of a typical "6/49" selection slip 12 in greater detail. For simplicity, only one game is shown. However, in practice a single selection slip 12 can include 6 to 10 games, i.e. 6 to 10 separate regions for selecting 6 of 49 numbers.

The scanner 20 that is normally used for reading bar code information is also used to read and capture the handmarked region 16 of the lottery slip 12. The hand-marked region 16 is different from a machine readable coded symbol such as a Universal Product Code (UPC) symbol. As illustrated and described herein in connection with FIG. 2A, the region 16 is composed of a plurality of darkened marks representing player-selected numbers.

The hand-mark region 16 has an anterior boundary line 30 and a posterior boundary line 32 spaced along a longitudinal direction. Preferably, but not necessarily, the region 16 has a first side boundary line 34 and a second side boundary line 36 spaced apart a transverse distance along a transverse direction perpendicular to the longitudinal direction.

The region 16 defined by the boundary lines 30, 32, 34, and 36 contains an array of labelled cells 40. In FIG. 2A, the cells are numbered 1 to 49, with an additional cell 41 labelled "void". The player will mark with a pencil six cells from the set of 49 numbered cells. The void cell 41 is used when the player has made an error and does not wish to register the numbers of the game with the host computer 24.

Occupied cells 42, i.e. marked cells, present different light reflectivity to the scanner 20 than non-occupied cells 44, i.e. unmarked cells. The occupied cells 42 are akin to bars, while the non-occupied cells 44 are akin to spaces of a UPC symbol. The occupied cells 42 represent binary ones, and the non-occupied cells 44 represent binary zeros.

When a scan line 50 of the scanner 20 transverses a row of cells in the region 16, the occupied cells 42 reflect less light than the non-occupied cells 44, and this light-variation information can be processed into data representative of the numbers selected by the player in a manner analogous to that already known in the art for processing a UPC symbol.

However, unlike a UPC symbol, which is onedimensional and can be scanned and read by a scan line anywhere along its height (i.e. the transverse 'Y' axis), a lottery selection slip's array of cells 40 represents a series of row information (i.e. the longitudinal 'X' axis) within prescribed transverse tolerances. In particular, the scan lines must read and decode three distinct rows within the handmark region 16. To decode the rows of cells, it is necessary to known which row of cells is being scanned by a particular scan line.

Figure 2B:
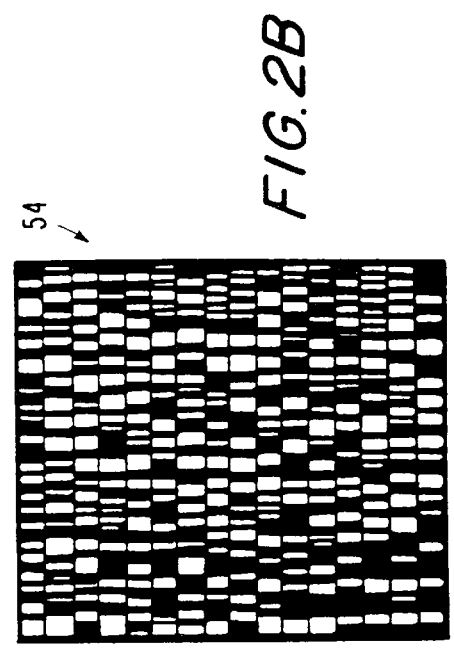
FIG. 2B illustrates a symbol structure representing the row identifier bar codes according to the present invention.

Row identifier bar codes 52 are located at the boundary lines 30 and 32 of the hand-mark region 16. The identifier bar codes 52 are multi-tiered symbol structures 54 (see FIG. 2B) having electro-optically scannable and readable encoded data arranged along the longitudinal and transverse directions. Each symbol structure 54 can be a unique two-dimensional marking symbol structure, a tiered bar code, or a new symbol structure compatible with prevailing standard bar code symbology.

Figure 3:
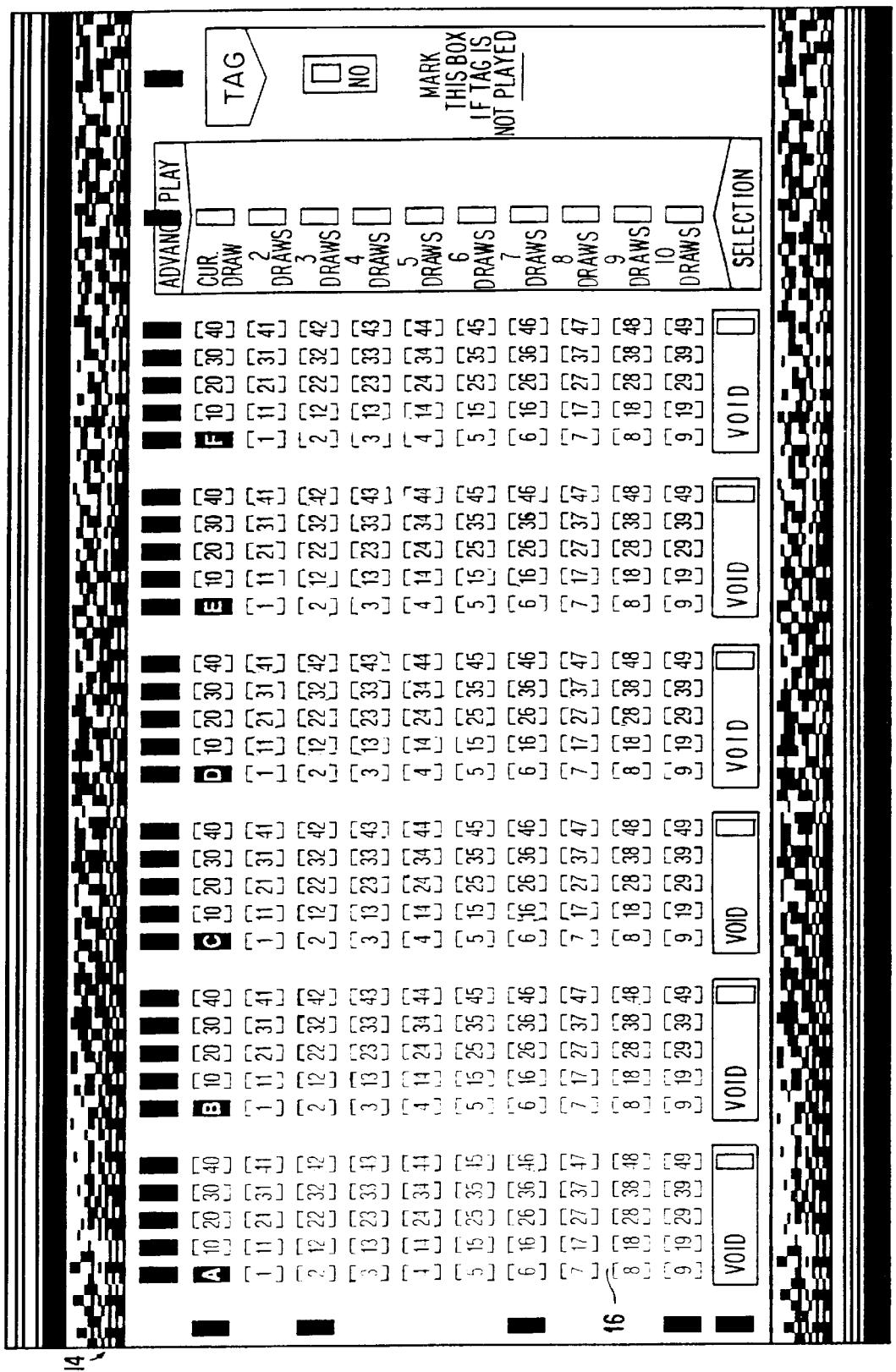
FIG. 3 illustrates an example of a complete lottery selection slip incorporating a bar code information region.

The identifier bar codes 52 arrange the encoded data in a plurality of longitudinally-extending rows 1, 2, 3, 4, . . . N, where N is the number of rows to be scanned. For example, as shown in FIG. 3 a typical lottery selection slip includes six games, each game having 3 rows, for a subtotal of 18 lines, plus two rows for advance play and one row for bonus games and the like, thereby totalling 21 rows, i.e. N=21.

Each row of encoded data includes a row identifier for identifying which row is being scanned at a particular time by a scan line. As shown in FIG. 2A, for horizontal scan line 50, the row identifier bar codes 52 each contains data that identifies the row being scanned at the moment as being row 1 (i.e. line 1 of game 1).

In use, the scanner 20 emits a scan line which is positioned, as is scan line 50, horizontally across the cells 40 with a zero slope, i.e. where the same numbered row of both the bar codes 52 is traversed by the same scan line. The scan line 50 overscans the symbol structure 54. For example, a four inch linear scan is generally sufficient to extend over the regions 14 and 16. A slight amount of overscan 56 helps minimize uneven beam spot speed at the ends of the scan line 50.

If the decode module 22 determines that the scan line has a slope and is reading row 1 at one end (i.e. at boundary line 30) and row 2 or 3 at the other end (i.e. at boundary line 32), then the scanner 20 will compensate for the slope until the row reading from both ends (i.e. lines 30 and 32) are identical.

The scanner 20 is positioned proximate the selection slip 12. The photosensor on-board the scanner 20 detects the variable light intensity presented to the scan line 50 of the row identifier bar codes 52 in region 14, and the occupied cells 42 and non-occupied cells 44 in the region 16. As shown in FIG. 2A, for scan line 50 which traverses row 1, the marked cells 42 (cells 3, 7, 9, and 16) represent occupied cells, and the empty cells 44 (1, 2, 4–6, 8, 10–15) represent non-occupied cells.

Analog electrical signals corresponding to the bar codes 52 and the occupied and non-occupied cells 42, 44 are generated by a photosensor (not shown) in the scanner 20. These analog signals are digitized by an analog-to-digital converter and thereupon decoded in accordance with an algorithm under the control of a microprocessor in the decode module 22. The decoded signals are stored in a memory component in the decode module 22. A ticket receipt is then issued by the printer 26 representing a hard-copy of the numbers selected by the player and decoded by the system 10.

Rather than manually displacing the scanner 20 in the transverse direction, the scan line can be itself automatically swept along the "Y" axis. For example, the output of the scanner need not be a single scan line as described above, but the scanner 20 can be operated in a raster mode composed of a set of mutually parallel scan lines. See, for example, U.S. Pat. No. 4,816,661.

Figure 4:
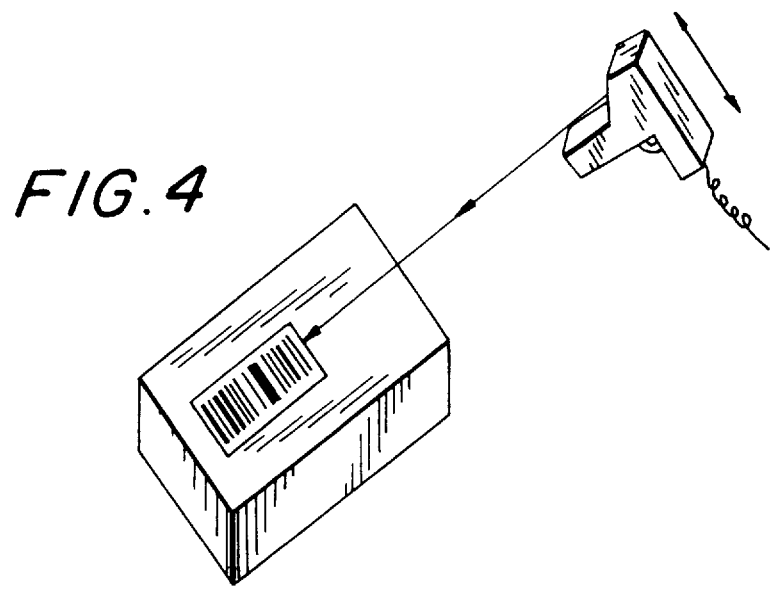
FIG. 4 illustrates a perspective view of a hand-held reader.
Figure 5:
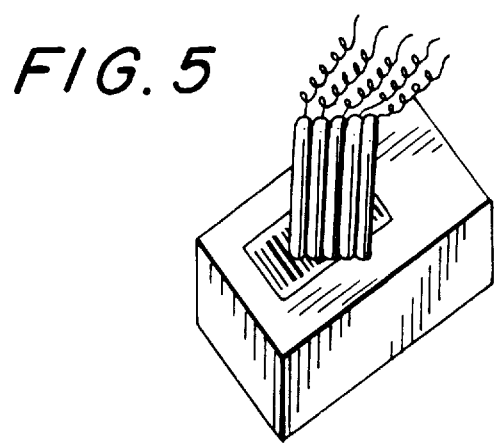
FIG. 5 illustrates a perspective view of a wand reader.
Figure 6:
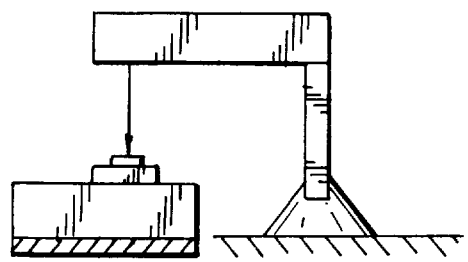
FIG. 6 illustrates a side elevational view of a reader used in a fixed work station environment.

The scanner 20 can be (a) held in an operator's hand and positioned remotely from the readable regions 14 and 16 of the selection slip 12 in a non-contact mode (FIG. 4); (b) positioned against the readable regions 14 and 16 of the selection slip 12 in a contact mode using a wand (FIG. 5). The scanner 20 need not be displaceable by itself, but can be fixed in a position as in the case of a scanning work station 60 (FIG. 6) in which the selection slip 12 is moved past the fixed work station 60 by being conveyed along a conveyor 62.

The system and method of the present invention enables lottery selection slip readers to use relatively simple and accessible bar-code reader technology without sacrifice to decoding accuracy. There is no need for precise positioning and conveying of the selection slip through a reader.

We claim:

1. An arrangement for electro-optically capturing hand-marked cells from a lottery selection slip, comprising:
    a) a play region having a plurality of cells on said lottery selection slip for receiving indicia to be captured, said cells including a plurality of occupied cells defined by hand-marked indicia and a plurality of non-occupied cells defined by unmarked indicia, said occupied cells and non-occupied cells together equaling the total number of cells in the play region;
    b) row-identifier codes spaced apart of each other along a longitudinal direction at opposite boundaries of the play region, said codes including electro-optically scannable and readable encoded data arranged in a plurality of ordered rows tiered along a transverse direction extending generally orthogonal to the longitudinal direction, each row extending along the longitudinal direction, each row of each code including row identifier data for identifying each row; and
    c) a reader for electro-optically scanning light along scan lines that extend over the play region of occupied and non-occupied cells and over each code, and for decoding which of the cells are occupied and the row identifier data for each scan line as each line traverses the boundaries of the play region of cells, said occupied cells having a different light reflectivity than the non-occupied cells, said reader including
        (i) a housing,
        ii) a light source in the housing for generating a light beam exteriorly of the housing,
        iii) a scanner for sweeping the light beam along mutually parallel sweep directions to form a raster pattern consisting of a plurality of mutually parallel scan lines,
        iv) a decoder for capturing the identity and the location of the occupied cells and the non-occupied cells, said decoder being operative for generating a digitized electrical signal having two states, each indicative of one of the occupied and non-occupied cells; and
        v) a storage element for storing the digitized signal.

2. The arrangement of claim 1; and further comprising a printer for printing a ticket receipt representative of the stored digitized signal.

3. The arrangement of claim 1, wherein the housing has a hand-held handle.

4. The arrangement of claim 1, wherein the reader is fixed relative to the lottery selection slip, and further including a conveyor for conveying the selection slip past the fixed reader.

5. The arrangement of claim 1, wherein said play region is printed on a sheet of paper of prescribed size.

6. The arrangement of claim 1, wherein each row identifier code is a two-dimensional bar code symbol.

7. The arrangement of claim 1, wherein the light source is a laser, and wherein the light beam is visible across the play region and the codes.

8. The arrangement of claim 7, wherein the cells in the play region are numbered sequentially from 1 to N, where N is the maximum number to be selected.

9. The arrangement of claim 8, wherein N is equal to forty nine, and wherein the number of occupied cells is equal to six.

10. A method of electro-optically capturing hand-marked cells from a lottery selection slip, comprising the steps of:
    a) providing a play region having a plurality of cells on said lottery selection slip for receiving indicia to be captured, said cells including a plurality of occupied cells defined by hand-marked indicia and a plurality of non-occupied cells defined by unmarked indicia, said occupied cells and non-occupied cells together equaling the total number of cells in the play region;
    b) providing row-identifier codes spaced apart from each other along a longitudinal direction located at opposite boundaries of the play region, said codes including electro-optically scannable and readable encoded data arranged in a plurality of ordered rows tiered along a transverse direction extending generally orthogonal to the longitudinal direction, each row extending along the longitudinal direction, each row of each code including row identifier data for identifying each row;
    c) scanning along scan lines that extend over the play region of cells occupied and unoccupied by the indicia and over each code, and for decoding the row identifier data for each scan line as each scan line traverses the boundaries of the play region of cells, the occupied cells having a different light reflectivity than the non-occupied cells;
    d) capturing the identity and the location of the occupied cells and the non-occupied cells;
    e) generating a digitized electrical signal having two states, each indicative of one of the occupied and non-occupied cells; and
    f) storing the digitized signal.

11. The method of claim 10; and further comprising the step of printing a ticket receipt representative of the digitized signal.

* * * * *